United States Patent
Bosma

(10) Patent No.: US 6,469,760 B1
(45) Date of Patent: Oct. 22, 2002

(54) NORMALLY WHITE SUPER TWISTED NEMATIC DISPLAY

(75) Inventor: Martin Bosma, Arnhem (NL)

(73) Assignee: Dejima Tech B.V., Arnhem (NL)

( * ) Notice: Subject to any disclaimer, the term of this patent is extended or adjusted under 35 U.S.C. 154(b) by 0 days.

(21) Appl. No.: 09/715,793

(22) Filed: Nov. 17, 2000

(30) Foreign Application Priority Data

Nov. 19, 1999 (EP) .............................. 99203866

(51) Int. Cl.[7] .............................. G02F 1/1335
(52) U.S. Cl. ...................... 349/117; 349/105; 349/180; 349/181
(58) Field of Search ................... 349/117, 104, 349/121, 161, 168, 169, 180, 181

(56) References Cited

FOREIGN PATENT DOCUMENTS

| EP | 0 584 943 | 3/1994 | ......... G02F/1/1335 |
|---|---|---|---|
| EP | 0 795 773 | 9/1997 | ........... G02F/1/133 |
| EP | 000795773 A1 * | 9/1997 | |
| EP | 0 936 490 | 8/1999 | ......... G02F/1/1335 |
| WO | WO 97/23805 * | 7/1997 | |

OTHER PUBLICATIONS

*M. Bosma, P.P. de Wit, A. Steenberger, S.J. Picken, LP–F: Late–News Poster: Twisted Liquid–Crystalline Retarders Providing Temperature–Matched Compensation of STN Displays*, publication date May 13, 1997, pp. 679–682.

* cited by examiner

Primary Examiner—William L. Sikes
Assistant Examiner—Hoan Nguyen
(74) Attorney, Agent, or Firm—Richard P. Fennelly

(57) ABSTRACT

The invention pertains to a normally white super twisted nematic (NW-STN) display comprising a super twisted nematic (STN) display cell and a compensation layer, characterized in that the compensation layer is a twisted liquid crystalline polymer and has an optical retardation (OR) which is 10 to 50% of the OR of the display cell in the off-state, and wherein the absolute value of the twist angle of the compensation layer is between 150° and 10° and is at least 90° smaller that the absolute value of the twist angle of the STN display cell. Preferably, the compensation layer of the NW-STN display is temperature matched with the STN display cell.

6 Claims, No Drawings

NORMALLY WHITE SUPER TWISTED NEMATIC DISPLAY

The present application claims priority of European Patent Application Serial No. 99203866.1, filed Nov. 19, 1999.

The invention pertains to normally white super twisted nematic (NW-STN) displays and to a method of manufacturing the same.

Super twisted nematic (STN) displays are known in the art, for instance as disclosed in EP 0,936,490. They have large twist angles (typically about 180°–270°) as compared to conventional twisted nematic (TN) liquid crystalline displays (LCD's). The STN structure results in very steep electro-optical response characteristics, which is required for high multiplex driving. For this reason STN-LCD's have superior image quality as compared to conventional TN-LCD's when used for large displays with a high level of passive multiplexing. However, due to the birefringence effect of the STN liquid crystalline (LC) layer, these displays show a poor contrast and are not achromatic, which limits their use in black-white (BW) and color displays.

A solution for these unwanted color effects of STN displays has been found by using a second STN-layer, stacked with its optical axis perpendicular to the optical axis of the display layer, to compensate these color effects. This method of compensation is based on the principle of the Babinett compensator: for perpendicular incident light the optical effect caused by a uniform birefringent layer can be fully compensated by a second, identical layer placed perpendicular to the first layer. From this, it follows that the optical effects that occur in the STN display cell can be fully compensated with a second STN layer (=compensation or retardation layer) if this layer has the same value of the optical retardation (OR) and an equal but opposite twist angle as compared to the STN-display cell, whereby the OR is expressed as the product of layer thickness and birefringence $(d \cdot \Delta n)$.

The high compensation quality of such STN-compensation layers is demonstrated in double cell super twisted nematic (DSTN) displays, where the optical effects of the addressable STN-LC-cell are compensated by using a second, identical (non-addressed) STN LC-cell with an opposite twist. If such a DSTN display is placed between crossed polarizers, the off-state of the compensated display is very black and the contrast ratio of these normally black (NB) display can be very high (by proper tuning of the retardation value and the twist angle of the cells). Such NB displays are dark in their off-state and bright in their on-state. These DSTN displays have a high image quality but suffer from their increased weight and thickness, fragility, and high production costs.

To avoid the drawbacks of DSTN displays, uniformly stretched (untwisted) films of polymers, mainly polycarbonate, are nowadays often used for the optical compensation of STN displays although these layers cannot fully compensate the addressable display cell as they lack the required twist angle and temperature dependence of the retardation. The problems of twist angle and temperature dependence of the stretched polymer compensation layers can be avoided by using twisted, temperature-matched LCP compensation layers such as disclosed in EP 0,868,680, and commercially available as Twistar™.

Displays having specific values for the twist angle and optical retardation of the display cell and the retardation layer were disclosed in EP 0,584,943. These displays contain a phase plate of a polymeric film which is uniaxially extended and are normally black displays.

Normally white displays were disclosed in EP 0,795,773. These displays do not contain liquid crystalline polymers but two pairs of liquid crystalline monomers sandwiched between two substrates, whereas one of these pairs is active by applying a voltage and the other is passive. The twist angles of the retardation cell and of the display cell of these displays differ largely and/or the optical retardation (OR) of the retardation cell is (much) more than 50% of the OR of the display cell in the off-state. Such displays have a far from ideal contrast, which, moreover, is not constant over the whole wavelength range.

However, the displays compensated with a uniformly stretched polymeric retarder and the displays compensated with a compensator with the same retardation value as the display cell in the off-state and the same, but opposite, twist angle, all have the drawback that they are not very suitable for high quality normally white (NW) displays. These NW displays are bright in their off-state, and black in the on-state. In some applications, NW displays are preferred over NB displays, for instance in reflective applications or positive mode displays (=dark character on bright background). If untwisted compensation films are used or if compensation layers with equal, but opposite, twist angle and equal retardation value as the addressable cell are used, the brightness of the off-state of the compensated display can be high. However, a severe drawback of these compensated displays is that their on-state is not very dark resulting in a low contrast ratio (=ratio of transmission level in the bright state and that in the dark state). The present invention has to its object obtaining a NW-STN display, which has a good brightness in its off-state and a perfectly black on-state. It is therefore proposed to use slightly twisted compensation layers (optimized to compensate the on-state of the STN-display). These slightly twisted compensation layers have a low optical retardation value, which is much smaller than that of the display cell in the off-state. More particularly, the invention pertains to a normally white super twisted nematic (NW-STN) display comprising a super twisted nematic (STN) display cell and a compensation layer, characterized in that the compensation layer is a twisted liquid crystalline polymer and has an optical retardation (OR) which is 10 to 50% of the OR of the display cell in the off-state, and wherein the absolute value of the twist angle of the compensation layer is between 150° and 10° and is at least 90° smaller that the absolute value of the twist angle of the STN display cell.

In a preferred embodiment the compensation layer is a twisted liquid crystalline polymer and has an optical retardation which is 10 to 35% of the OR of the display cell in the off-state.

In another preferred embodiment the absolute value of twist angle of the compensation layer is equal or less than 50% of the twist angle of the STN display cell, and more preferably, the sign of the twist angle of the compensation layer is opposite to the sign of the twist angle of the STN display cell.

If it is required that these advantageous properties are maintained over a broad temperature range, the NW-STN displays of this invention can be provided with a temperature-matched compensation layer, for example, a temperature-matched LCP compensation layers such as disclosed in EP 0,868,680, and commercially available as Twistar™, wherein the compensation layer is temperature matched with the STN display cell.

More particularly the NW-STN display then comprises a compensation layer with a high-molecular weight liquid crystalline material having a nematic phase above its Tg (glass transition temperature) and a dynamic viscosity at the working temperature of at least 100 Pa·s, and whereby the difference of the Tc (clearing temperature) of the high-molecular weight material and the Tc of the STN display cell is in the range of −30° C. to +30° C., preferably in the range of −20° C. to +20° C., and more preferably in the range of −10° C. to +10° C.; and the Tg of the high-molecular weight liquid crystalline material is lower than 50° C. To obtain a white display in the off-state, the liquid crystalline display of the invention includes two polarizers and does not contain a uniaxially extended polymeric film.

The invention further pertains to a method of manufacturing the above-mentioned NW-STN display wherein an STN display cell and a compensation layer are selected such that the compensation layer has an optical retardation which is 10 to 50% of the of the display cell in the off-state, and more preferably 10 to 35% of the of the display cell in the off-state, and wherein the absolute value of the twist angle of the compensation layer is between 150° and 10°, and at least 90° smaller that the absolute value of the twist angle of the STN display cell.

The NW-STN displays of this invention, which are compensated with the proposed compensation layer and placed between the two (almost) crossed polarizers show very black on-states and very high contrast ratios. If temperature-matched, slightly twisted compensation layers are used, the on-state remains very dark and the contrast ratio remains very high even at elevated temperatures.

The invention is further illustrated by the following examples.

Comparison Example 1

A typical NW-STN display cell ($R_{550\ nm}$=788 nm, $\phi$=+240°) compensated with a polycarbonate compensation layer (untwisted, $R_{550\ nm}$=566nm, laminated on top with slow axis at −75° relative to output-director of display cell) and placed between two high-efficiency polarizers ($T^1_{//}$= 31.7%; $T_x$=0.02%) laminated with their absorption axis at −10° and 105° at front and back of display, respectively, has a luminance of 1.9% in the on-state and a contrast ratio of 15:1 (perpendicular incident, white light; no reflection).

EXAMPLE 1

If the same display cell of comparison example 1 is compensated with a compensation layer having $R_{550}$ nm=234 nm, $\phi$=−40°, and this compensated display is placed between the same (but now crossed) polarizers, the luminance level for the on-state is 0.2% and the contrast ratio is 120:1 (perpendicular incident, white light; no reflection).

EXAMPLE 2

If the same display cell as used in comparison example 1 is compensated with a compensation layer having $R_{550\ nm}$=258 nm, $\phi$=+−46°, and this compensated display is placed between the same (but now crossed) polarizers, the luminance level for the on-state is 0.07% and the contrast ratio is 350:1 (perpendicular incident, white light; no reflection).

EXAMPLE 3

To increase the brightness of the off-state of the compensated NW-STN displays of examples 1 or 2, the retardation value of the display (and that of the compensation layer) may be increased. An NW-STN display cell with a retardation value 20% higher than used in comparative example 1 ($R_{550\ nm}$=946 nm, $\phi$=+240°) is compensated with a compensation layer wherein R is increased with 20% to $R_{550\ nm}$=310 nm ($\phi$=−46°) and placed between the same (but now crossed) polarizers. The luminance level for the off-state will increase 17% compared to the display with of Example 2, whereas the luminance level for the on-state remains low at 0.1% and the contrast ratio remains high at 250:1 (perpendicular incident, white light; no reflection).

What is claimed is:

1. A normally white super twisted nematic (NW-STN) display comprising a super twisted nematic (STN) display cell and a compensation layer, characterized in that the compensation layer is a twisted liquid crystalline polymer and has an optical retardation (OR) which is 10 to 35% of the OR of the display cell in the off-state, and wherein the absolute value of the twist angle of the compensation layer is between 150° and 10° and is at least 90° smaller that the absolute value of the twist angle of the STN display cell.

2. The NW-STN display of claim 1 wherein the absolute value of twist angle of the compensation layer is equal or less than 50% of absolute value of the twist angle of the STN display cell.

3. The NW-STN display of any one of claims 1–2 wherein the sign of the twist angle of the compensation layer is opposite to the sign of the twist angle of the STN display cell.

4. The NW-STN display of any one of claims 1, 2, or 3 wherein the compensation layer comprises a high-molecular weight liquid crystalline material having a nematic phase above its Tg and a dynamic viscosity at the working temperature of at least 100 Pa.s, and whereby the difference of the Tc of the high-molecular weight material and the Tc of the STN display cell is in the range of −30° C. to +30° C., preferebly in the range of −20° C. to +20° C., and more preferably in the range of −10° C. to +10° C.; and the Tg of the high-molecular weight liquid crystalline material in lower than 50° C.

5. A method of manufacture the NW-STN display of any one of claims 1–2 or 4, characterized in that an STN display cell and a compensation layer are selected such that the compensation layer has an optical retardation (OR) which is 10 to 50% of the OR of the display cell in the off-state and wherein the absolute value of the twist angle of the compensation layer is between 150° and 10° and at least 90° smaller that the absolute value of the twist angle of the STN display cell.

6. The method according to claim 5 wherein the STN display cell and the compensation layer are selected such that the compensation layer has an optical retardation (OR) which is 10 to 35% of the OR of the display cell in the off-state and wherein the absolute value of the twist angle of the compensation layer is between 150° and 10° and at least 90° smaller that the absolute value of the twist angle of the STN display cell.

* * * * *

UNITED STATES PATENT AND TRADEMARK OFFICE
CERTIFICATE OF CORRECTION

PATENT NO. : 6,469,760 B1
DATED : October 22, 2002
INVENTOR(S) : Martin Bosma

It is certified that error appears in the above-identified patent and that said Letters Patent is hereby corrected as shown below:

Column 4,
Line 40, "preferebly" should be -- preferably --.

Signed and Sealed this

Twenty-fifth Day of February, 2003

JAMES E. ROGAN
*Director of the United States Patent and Trademark Office*